United States Patent
Duquesne

[11] 3,710,838
[45] Jan. 16, 1973

[54] APPARATUS FOR GRIPPING A WHEEL TO PERMIT REMOVAL OF A TIRE

[76] Inventor: Victor Duquesne, 42 Quellinstrant, Antwerpen, Belgium

[22] Filed: Jan. 20, 1971

[21] Appl. No.: 108,043

[30] Foreign Application Priority Data

Jan. 22, 1970  Belgium..............................49,840

[52] U.S. Cl................................................157/1.24
[51] Int. Cl...............................................B60c 25/06
[58] Field of Search............157/1.17, 1.2, 1.22, 1.24, 157/1.26, 1.28

[56] References Cited

UNITED STATES PATENTS

| | | | |
|---|---|---|---|
| 2,948,314 | 8/1960 | Bishman | 157/1.24 X |
| 2,777,507 | 1/1957 | Branick | 157/1.24 X |
| 2,923,347 | 2/1960 | Bishman | 157/1.24 |
| 3,557,861 | 1/1971 | Duquesne | 157/1.24 |

*Primary Examiner*—Granville Y. Custer, Jr.
*Attorney*—Linton & Linton

[57] ABSTRACT

An apparatus for gripping a wheel to permit the removal of a tire fitted on said wheel and includes means for displacing claws toward the periphery of a wheel of any diameter mounted on the apparatus and means for locking said claws towards the wheel.

7 Claims, 4 Drawing Figures

PATENTED JAN 16 1973

INVENTOR
VICTOR DUQUESNE

By Linton and Linton
ATTORNEYS

INVENTOR
VICTOR DUQUESNE

APPARATUS FOR GRIPPING A WHEEL TO PERMIT REMOVAL OF A TIRE

The present invention relates to apparatus for holding a vehicle wheel to permit removal of a tire fitted on to the wheel.

Wheel-gripping apparatus is known, which has a series of arms each of which is pivoted at one end on a fixed plate which forms part of the stationary framework of the apparatus, the other end terminating in a claw which is adapted to grip on the rim of a wheel. Each arm is free to slide in a channel formed in a block, the blocks being pivotally mounted on a rotary plate. With this apparatus, when it is required to bring the claws nearer to each other to grip on the periphery of a wheel, the rotary plate is displaced angularly by some means, and the change in the relative disposition of each arm pivot and its block causes the arm to turn inwardly.

The invention has for its object the provision of wheel-gripping apparatus of this type, which has simple means for displacing the claws rapidly towards the periphery of a wheel of any diameter when placed on the apparatus, and the provision of means for locking the claws against the wheel.

According to this invention apparatus for gripping a wheel, of the type described is provided with a control lever pivoted about a stationary axis displaced from the axis of rotation of the rotary plate, a bearing coupling the lever to the rotary plate to transmit motion from the lever to the plate, and pressure applying means adapted to act between the lever and the rotary plate, the pressure applying means including locking means for locking the pressure applying means to the lever.

Preferably the pressure applying means is adapted to be operated by fluid pressure means (i.e. hydraulic or pneumatic) and it is also preferred that the control member of the fluid pressure means is located adjacent to the lever, so that both the lever and the fluid pressure means can be controlled by the same operative. The fluid pressure control means may be adapted for operation by hand or foot, and the apparatus provides means for gripping the wheel simply and effectively in two movements, first a rapid movement controlled by the lever and second a tightening movement controlled by the fluid pressure means.

Preferably the locking means includes a guide formed with a hole to allow the lever to slide through it, and means for tilting the guide relatively to the lever so that the lever is no longer free to slide through the hole in the guide. The locking of the guide on to the handle provides a bearing or reaction point for the fluid pressure means in order to permit the pressure means to exert its gripping force on the wheel.

According to a preferred arrangement, the fluid pressure means acts between the guide which can be locked to the handle and a bearing block on the rotary plate, and the arrangement of the bearing block may be such that it is engaged by the lever during the first stage of operation to provide the bearing coupling the lever to the rotary plate.

The fluid pressure means preferably comprises a ram-and-cylinder device.

One construction of apparatus for holding a vehicle wheel to permit removal of a tire, will now by described by way of example only, with reference to the accompanying drawings, in which.

Figure 1:
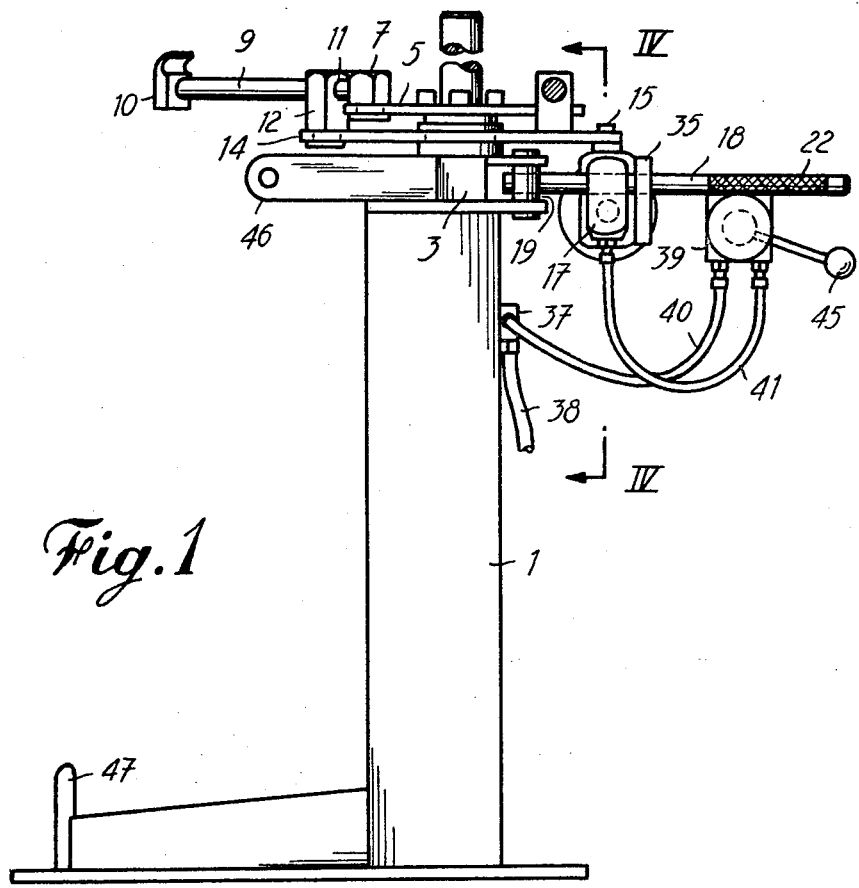
FIG. 1 is a front elevation of the apparatus.

This apparatus has a vertical column 1 extending upwardly from a baseplate 2. A short sleeve 3 having a base 4 is welded to the upper end of the column 1, and a triangular plate 5 is attached to the top of the sleeve 3 by means of bolts 6. The triangular plate 5 and the sleeve 3 therefore both form part of the stationary framework of the apparatus.

Near to each corner of the plate 5 there is a block 7 provided with an axle 8 which is free to turn in a corresponding hole in a plate. One end of an arm 9 is fixed in a hole in each of the blocks 7, and each arm extends horizontally, and is free to turn about the axis of its axle 8. A claw 10 for the purpose of gripping on the outside of a vehicle wheel is carried at the outer end of each of the arms 9.

A circular plate 14 is mounted below the triangular plate 5, and is free to rotate about the sleeve 3, and three small blocks 12 are provided on the plate at equiangularly spaced positions, each block 12 having an axle 13 which fits into a corresponding hole in the plate 14, so that each block 12 is free to pivot on its own axle. Each of the arms 9 extends through a hole in a corresponding one of the blocks 12, and is free to slide therein.

By virtue of the arrangement so far described, it will be clear that if the plate 14 is turned, the change in the relative dispositions of each associated pair of blocks 7 and 12 will produce a rotation of the arm 9 associated with these blocks about the axle 8, and this movement is accompanied by sliding of the arm 9 through its block 12 and inward or outward movement of the claw 10. Movement of the rotary plate 14 in a clockwise direction produces inward movement of the claws 10 to grip a wheel, and vice versa.

Figure 2:
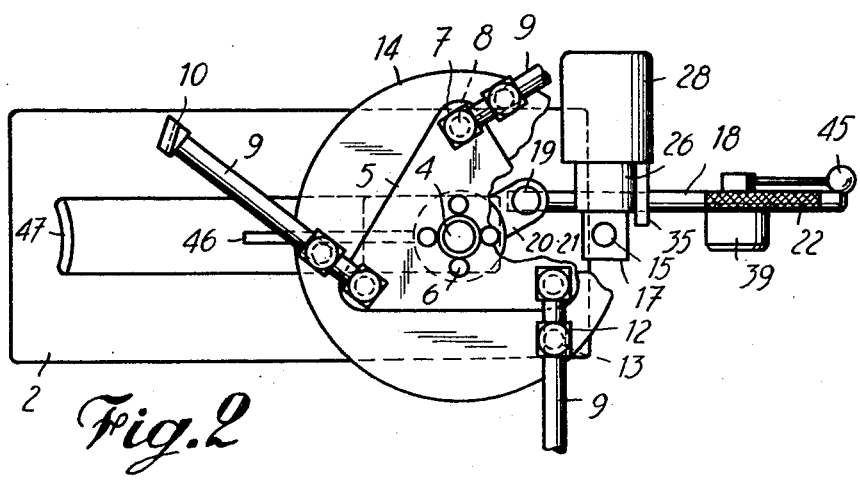
FIG. 2 is a partly cut-away plan view of the apparatus.

A rotatable axle 15 also passes through a hole in the rotary plate 14, at a position near to the outer edge of that plate, and a bearing block 17 is fixed on this axle. Two vertically spaced lugs 20 and 21 fixed to and projecting from the sleeve 3 provide a mounting for a pivot leg 19, in which there is fixed the inner end of a control lever 18. The lever 18 extends outwardly well beyond the edge of the plate 14, and the outer part is knurled as indicated at 22 to provide a handle. In the normal position, shown in FIGS. 2 and 4, the lever 18 bears on a face 33 of the block 17, so that if the lever is turned about its pivotal axis 19 in a clockwise direction, it exerts a pressure on the block 17 and the motion of the lever is transmitted to the plate 14 which is turned about its own axis. Thus the lever 18 and the bearing block 17 provide a means for manipulating the plate 14 to move the claws 10 rapidly inwards during a first stage of the wheel-gripping operation.

Figure 4:
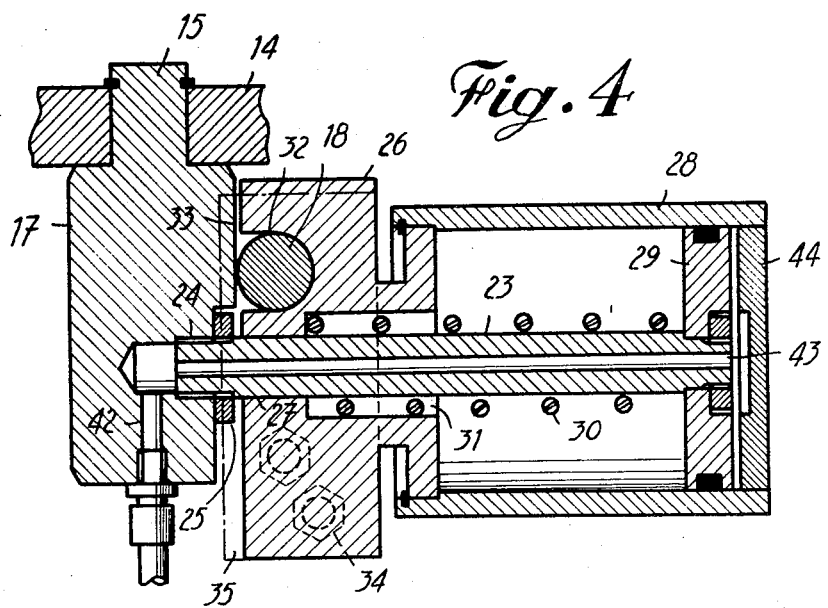
FIG. 4 is a detailed sectional view to a larger scale, looking in the direction or arrows IV—IV in FIG. 1.

A pneumatic pressure-applying device is provided, and this device has a guide block 26, which supports a pneumatic cylinder 28 (see especially FIG. 4). A piston 29 is slidable within the cylinder 28, and there is a piston rod 23, which extends through a front end of the cylinder, and through a hole 27 in the guide block 26, the front end of this rod 23 being screwed into a hole 24 formed in the bearing block 17. A nut 25 engages on the screwed end of the piston rod 23, and locks that rod to the block 17. In consequence, the guide block 26 and the cylinder 28 are supported by the rod 23 from the block 17.

Surrounding part of the piston rod 23 is a compression spring 30 which acts between the piston 29 and the front end of a chamber 31 formed in the guide block 26, and this spring pushes the guide block 26 towards the bearing block 17. In the guide block there is a groove 32 in which the lever 18 rests, and in the rest position of the apparatus, the guide block can slide axially along the lever 18, which is held between the groove 32 and the rear face 33 of the bearing block 17.

Figure 3:
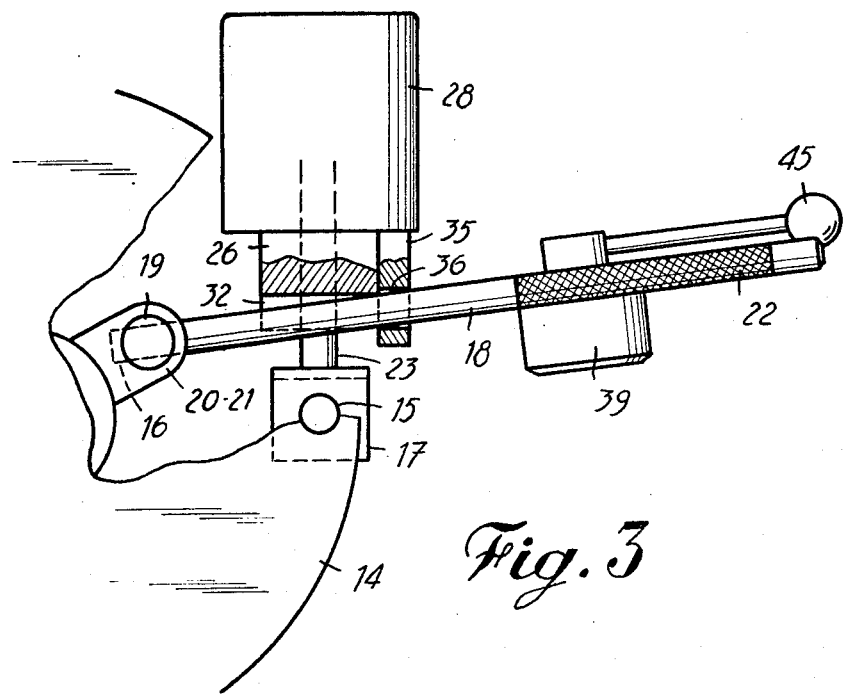
FIG. 3 is a partly cut-away plan view of a part of the apparatus, drawn to a larger scale, and showing certain parts in a locked condition.

A guide plate 35 is secured on the front face of the guide block 26 by means of bolts 34, and this plate projects forwardly of the guide block. A hole 36 is formed in this extension and the lever 18 passes through this hole, which, as shown in FIG. 3, is of slightly larger diameter than the lever 18.

The pneumatic apparatus includes a connection box 37 which is mounted on the column 1, and a feed pipe 38 from an air compressor (not shown) leads into the connection box. A three-way control valve 39 is mounted on the lever 18 and a pipe 40 leads from the connection box to the valve 39, and a further pipe 41 leads from the output side of the valve 39 to the underside of the bearing block 17. The pipe 41 is connected into an opening 42 in the block 17 and this opening communicates with a passage 43 which extends longitudinally through the piston rod 23, and which allows compressed air to be supplied to between the piston 29 and the bottom 44 of the cylinder 28.

The valve 39 is controlled by a handle 45 positioned near to the handle 22 of the lever 18. This is advantageous, because it enables the operative to manipulate both the lever 18 and the handle 45, and indeed both items can be gripped in one hand if desired.

The bore 4 of the sleeve 3 can receive a shaft which supports a tool for fitting or removing a tire from a wheel clamped on the apparatus. This tool is not illustrated because it does not form part of the present invention. On the column 1 there is fixed a support 46 to which can be attached an apparatus for freeing tires, and an attachment 47 fixed to the baseplate 2 is provided for holding a wheel with a tire to be freed.

In the rest position of the apparatus the control lever 18 is held between the guide block 26 and the flat face 33 of the block 17. When it is necessary to grip a wheel on the apparatus, the wheel is placed resting on the arms 9 between the three claws 10. Then the control lever 18 is swung horizontally by hand, carrying with it the bearing block 17 and thus causing rotation of the plate 14 and rapid contraction of the claws 10 towards the circumference of the wheel. As soon as these claws have reached the wheel the handle 45 which controls the valve 39 is pulled, thus causing the admission of air under pressure into the cylinder 28 via the pipe 41, the opening 42 and the channel 43. This air then exerts a pressure between the piston 29 and the bottom 44 of the cylinder 28. Because of this the cylinder 28 moves with the guide block 26 and the plate 35 on the piston rod 23 and goes away from the piston 29, whereas this piston rod with the piston remains immobile, from which there results a displacement of the control lever through another angle in relation to the plate 35. Because of this the lever 18, which is pivotally fixed, is locked in the hole 36 of the plate 35 (FIG. 3) in an oblique position. At this moment the cylinder 28 and the lever 18 cannot move further and serve as a point of support for the piston rod 23, the piston 29 and the bearing block 17. When air now exerts a pressure on the piston 29 there results a small movement of this piston, the piston rod 23 and the bearing block 17. The block 17 acts on the plate 14 to turn the plate clockwise and the claws 10 are pressed and locked against the periphery of the wheel.

To disengage the wheel the handle 45 of the valve 39 is brought to its initial position. Because of this the cylinder 28 is open to the atmosphere. The spring 30 pushes the guide block 26 towards the bearing block 17 and brings, by means of the plate 35, the control lever 18 to its starting position. By this movement, the lever 18 is freed and can again slide in the hole 36 of the plate 35. It therefore suffices to move the lever 18 by hand to withdraw the claws 10 from the wheel.

I claim:

1. An apparatus for gripping a wheel to permit removal of a tire fitted onto the wheel, comprising a vertical column, a horizontal plate fixed on said column, a series of arms each of which is pivoted at one end on said plate and has the other end terminating in a claw which is adapted to grip on the rim of a wheel, a guiding block for each of said arms provided with an opening with its respective arm slideably extending through said opening, a second horizontal plate rotatably mounted on said column, on which said blocks are pivotally mounted, a lever having one end pivoted about a stationary axis displaced from the axis of rotation of said rotary plate and of which the other end is a handle, a bearing block fixed on said rotary plate and positioned for being engaged by said lever to transmit motion from said lever to said plate, a guide plate formed with a hole of a slightly larger diameter than that of said lever which slideably extends through this guide plate hole, and means for the mutual oblique displacing of said lever and said guide plate whereby said lever is blocked in said hole of the guide plate while said means exerts a pressure on said bearing block for pressing the claws against the wheel.

2. An apparatus as claimed in claim 1, in which said means for displacing the lever and the guide plate is adapted to be operated by fluid pressure means.

3. An apparatus as claimed in claim 2, including a valve for the fluid pressure means, located adjacent to said handle of the lever.

4. An apparatus as claimed in claim 1, in which said displacing means includes a cylinder, a piston slideable in said cylinder, a piston rod extends between said piston and said bearing block, said cylinder is slideable on said piston and supports said guide plate of the lever, a channel to admit air under pressure is provided between said piston and one end of said cylinder and a compression spring is provided between said piston and the other end of said cylinder.

5. An apparatus as claimed in claim 4, in which the channel is formed in said bearing block and in said piston rod.

6. An apparatus as claimed in claim 4, in which a guide block is carried by said cylinder and has a groove in which the lever is received.

7. An apparatus as claimed in claim 1, in which said bearing block is pivoted on said rotary plate and has a flat face on which said lever bears.

* * * * *